United States Patent Office 3,113,880
Patented Dec. 10, 1963

3,113,880

CHEMICAL COMPOUNDS, POLYMERIC COMPOSITIONS AND SHAPED ARTICLES THEREOF

Guenther K. Hoeschele and John J. Verbanc, Wilmington, Del., assignors to E. I. du Pont de Nemours and Company, Wilmington, Del., a corporation of Delaware No Drawing. Filed Jan. 4, 1961, Ser. No. 80,518
16 Claims. (Cl. 106—187)

This invention relates to compositions containing novel benzophenone compounds and, more particularly, to polymeric shaped articles containing these benzophenones.

This application is a continuation-in-part of our copending application Serial No. 781,464, filed December 19, 1958, now issued as U.S. Patent No. 3,008,995.

There are many organic compounds which absorb light rays within the region of from 3000 to about 4000 A. units. Some of these compounds have been used to protect various materials or substrates which are sensitive to these rays by either directly incorporating them into the sensitive substrate or by applying them as a coating to its surface. Another method by which they may be used is to incorporate them into a second substrate, usually a transparent film which then functions as an ultraviolet filter and protects the first substrate. Many of these known photo-stabilizer compounds have not been entirely satisfactory. One of the reasons for this is that they oftentimes absorb weakly in the wave length region where the harmful ultraviolet rays exist. On the other hand, some of these compounds which have the property of absorbing strongly in the proper wave length region are usually so insoluble in the substrate that a proper amount of the compound cannot be incorporated therein to obtain the desired degree of protection.

It is an object of the present invention to provide compositions containing novel benzophenone compounds which overcome the above mentioned difficulties. A further object is to provide polymeric shaped articles containing these benzophenone compounds which articles are photo-stabilized in that they resist the adverse effects of ultraviolet radiation. Other objects will appear hereinafter.

These and other objects of this invention are accomplished by compositions of matter comprising a thermoplastic polymeric resin, preferably selected from the group consisting of polyurethanes, cellulose esters and vinyl halide polymers and from 0.0005%, preferably from 0.5% to 10%, based on the weight of the resin, of at least one benzophenone compound of the following formula:

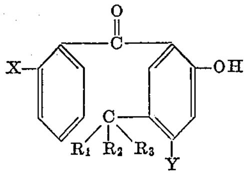

wherein

X is hydrogen or hydroxy,

Y is hydroxy or alkoxy of up to 20 carbon atoms, and $R_1$, $R_2$ and $R_3$ are lower alkyl. Preferably,

is a radical selected from the group consisting of tertiary butyl, tertiary amyl, 1,1-dimethylbutyl and 1,1,3,3-tetramethylbutyl.

Representative examples of benzophenone compounds for use in the present invention include 5-tert-butyl-2,2',4-trihydroxybenzophenone;
5-tert-amyl-2,2',4-trihydroxybenzophenone;
5-(1,1-dimethylbutyl)-2,2',4-trihydroxybenzophenone;
5-(1,1,3,3-tetramethylbutyl)-2,2',4-trihydroxybenzophenone;
5-tert-butyl-2,2'-dihydroxy-4-methoxybenzophenone;
4-pentoxy-5-tert-butyl-2,2'-dihydroxybenzophenone;
5-tert-butyl-4-dodecoxy-2,2'-dihydroxybenzophenone;
5-tert-amyl-4-ethoxy-2,2'-dihydroxybenzophenone;
5-tert-amyl-4-eicosoxy-2,2'-dihydroxybenzophenone;
5-tert-amyl-2,4-dihydroxybenzophenone;
5-tert-butyl-2,4-dihydroxybenzophenone;
5-(1,1-dimethylbutyl)-2,4-dihydroxybenzophenone;
5-(1,1,3,3-tetramethylbutyl)-2,4-dihydroxybenzophenone;
5-tert-butyl-2-hydroxy-4-methoxybenzophenone;
5-tert-butyl-4-dodecoxy-2-hydroxybenzophenone;
5-tert-butyl-4-eicosoxy-2-hydroxybenzophenone;
5-tert-amyl-2-hydroxy-4-methoxybenzophenone;
5-(1,1-dimethylbutyl)-2-hydroxy-4-methoxybenzophenone;
5-(1,1-dimethylbutyl)-4-hexoxy-2-hydroxybenzophenone and
5-(1,1,3,3-tetramethylbutyl)-4-dodecoxy-2-hydroxybenzophenone.

The benzophenones may be prepared by alkylating a benzophenone of the formula:

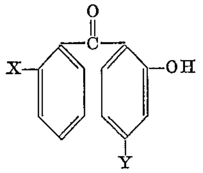

wherein X and Y are as defined above, with a terminally unsaturated hydrocarbon such as isobutylene or 2-methylbutene-1 in the presence of an acidic catalyst. The alkyl group is introduced at the 5 position into the ring bearing the hydroxy group and the Y substituent. In the compounds having an alkoxy group in the 4 position, it is preferable to alkylate the corresponding 4 hydroxy compound with the unsaturated hydrocarbon so as to introduce the alkyl group at the 5 position, and then etherify the 4 hydroxy group by conventional methods.

The alkylation of the benzophenone should be carried out at temperatures from 60° to 80° C. with a temperature from 65° to 75° C. being preferred. The unsaturated hydrocarbon is introduced over a period of from about 1 to 5 hours into a well-agitated mixture containing the benzophenone, the acidic catalyst and an inert hydrocarbon or a chlorinated hydrocarbon solvent. This solvent dissolves the benzophenone during the alkylation. From about 1 to about 3 mols of unsaturated hydrocarbon per mol of benzophenone should be employed. However, it is to be understood that only one alkyl group is introduced into the benzophenone structure, and that occurs at the 5 position, whether or not a molar excess of the unsaturated hydrocarbon is used. After all of the unsaturated hydrocarbon has been introduced, agitation may be continued in order to insure that the alkylation is complete. The resulting mixture is then cooled to room temperature and neutralized with aqueous sodium bicarbonate. The organic phase is then treated and concentrated under vacuum to yield the desired alkylated benzophenone product. In the event that the product is insoluble in the cold reaction mixture, it may be collected by filtration and washed acid-free with dilute aqueous sodium bicarbonate and water.

In carrying out the process for the preparation of the benzophenone compounds, benzene is the preferred inert solvent. About 50 to 300 parts by weight is used for every 100 parts by weight of the benzophenone compound to be alkylated. It is to be understood that the amount of solvent used will depend on the particular benzophenone compound employed. For example, at least about 140 parts of benzene is supplied for every 100 parts of 2,2′,4-trihydroxybenzophenone but 50 parts of benzene will suffice for every 100 parts of 2-hydroxy-4-methoxybenzophenone. Other inert solvents which may be used include aromatic hydrocarbons such as toluene, m-xylene, halogenated aromatic hydrocarbons such as o-dichlorobenzene and halogenated aliphatic hydrocarbons such as carbon tetrachloride.

p-Toluene sulfonic acid and sulfuric acid are particularly useful catalysts. The catalyst preferred and the amount used will depend on the benzophenone compound being alkylated. For example, when 2,2′,4-trihydroxybenzophenone is alkylated, concentrated sulfuric acid is preferred. At least 3 parts by weight (preferably 5 parts) of sulfuric acid is used for every 100 parts by weight of the benzophenone when isobutylene is the alkylating agent, but 10–15 parts by weight is preferably employed when higher olefins such as 2-methyl-butene-1 are used. Optionally, 10, preferably 20, parts of p-toluene sulfonic acid is used for alkylating 2,2′,4-trihydroxybenzophenone. However, when 2,4-dihydroxybenzophenone is alkylated, p-toluene sulfonic acid (at least 15 parts, preferably 20 to 30 parts) is the better, more efficient catalyst; sulfuric acid may be used, alternatively (at least 10 parts). The amount of catalyst to be used will be more particularly illustrated in the following examples.

The conversion of 5-alkyl-2,4-dihydroxybenzophenones (or the 5-alkyl-2,2′,4-trihydroxybenzophenones) to the corresponding 4-alkoxy compounds is accomplished by conventional etherification procedures familiar to those skilled in the art. For example, the 4-methoxy compounds are made by forming the potassium salt of the 4-hydroxyl group and reacting with dimethyl sulfate. Higher alkoxy derivatives are made by the Williamson synthesis using primary alkyl halides (preferably the bromides) in a polar solvent such as methyl ethyl ketone. Temperatures above 50° C. are preferred in order to attain a convenient reaction rate. Suitable procedures are described in U. S. Patents 2,853,521 and 2,693,492.

The alkylation process of this invention results in the introduction of an alkyl group in the 5 position on the ring in the benzophenone compound which bears the hydroxy substituent and the Y substituent. The alkyl substituent which is introduced at this 5 position may be represented by the structure

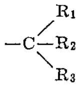

wherein $R_1$, $R_2$ and $R_3$ are as defined above. It is to be understood that the term "lower alkyl" includes alkyl groups of up to about 8 carbon atoms. Representative terminally unsaturated hydrocarbons which may be used in the process include isobutylene; 2-methylpentene-1; 2-methylbutene-1; 2,4,4-trimethylpentene-1.

As mentioned above, the novel alkylated benzophenones of the present invention are highly useful photo-stabilizers in that they can be incorporated with a wide variety of substrates to absorb ultraviolet radiation. It has been determined that the introduction of the alkyl group in the 5 position of the benzophenone compound significantly increases the ultraviolet absorption of this compound as compared with the corresponding unalkylated benzophenone. It has been determined that the introduction of the alkyl group in the 5 position results in a bathochromic effect which is a shift of absorption maximum to longer wave lengths. As a result of the benzophenone compounds of the present invention being much more effective photo-stabilizers than the corresponding unalkylated materials, on a weight basis, they provide much more effective protection at a lower cost. Furthermore, the absorption of the subject compounds above 4400 A. (visible region of the spectrum) is so low that they introduce hardly any color into the substrates in which they are present. For example, comparison of a plot of percent transmission versus wave length for a solution of 250 mg. of 2,2′,4-trihydroxybenzophenone in methanol with an analogous plot for a solution of 125 mg. of 5-tert-butyl-2,2′,4-trihydroxybenzophenone in methanol shows that the latter, a representative subject compound, can introduce less color and yet be a more effective ultraviolet absorber than the unalkylated compound. Similar results are noted when comparing other representative subject compounds such as 5-tert-butyl-2,4-dihydroxybenzophenone and 5-tert-butyl-2-hydroxy-4-methoxybenzophenone with the corresponding benzophenones unalkylated in the 5-position. Finally, the subject compounds which are alkylated in the 5 position display greatly improved solubility in substrates of low polarity. Evidence of this change is given by the following table:

SOLUBILITY OF BENZOPHENONES IN n-OCTANE AT 22° C.

| Compound: | Solubility [1] |
|---|---|
| 2-hydroxy-4-methoxybenzophenone | 4.5 |
| 5-tert-butyl-2-hydroxy-4-methoxybenzophenone | 64 |

[1] Grams of benzophenone compound/100 g. solvent.

The benzophenones are significantly useful as ultraviolet screening agents. They can be incorporated into fibers, films and coatings. Thus, these compounds can be used in polar elastomers such as neoprene, copolymers of 1,3-butadiene and styrene and polyurethanes. They can be used with polar plastics, such as polymethyl methacrylate, cellulose esters, vinyl and vinylidene halide polymers, polyesters, polyesteramides and polyamides. Hence, the compositions embraced by the present invention include benzophenones with the following thermoplastic polymers: polyurethanes; butadiene polymers; polyamides; polyesteramides; cellulose esters such as cellulose propionate, cellulose butyrate; mixed cellulose esters such as cellulose acetate-butyrate, cellulose acetate-propionate; polymers of acrylic esters such as methyl methacrylate, ethyl acrylate, propyl acrylate, hexyl methacrylate; polymers of acrylonitrile and methacrylonitrile; polyesters such as polyethylene terephthalate, polyethylene isophthalate, polyhexamethylene terephthalate; copolyesters such as ethylene terephthalate-neopentyl terephthalate; vinyl polymers such as those from vinyl chloride, vinyl fluoride, vinyl chloride/vinyl acetate, vinyl fluoride/vinyl acetate, vinyl fluoride/tetrafluoroethylene, vinyl chloride/acrylonitrile, vinyl chloride/methyl methacrylate, vinyl chloride/maleic anhydride, vinyl chloride/vinyl isobutylether; vinylidene polymers such as those from vinylidene fluoride/hexafluoropropene, vinylidene chloride/acrylonitrile, vinylidene chloride/vinyl chloride, vinylidene chloride/ethyl acrylate, vinylidene chloride/styrene, vinylidene fluoride/ethylene, vinylidene chlorofluoride/acrylonitrile; and olefin polymers such as those from ethylene, propylene, butene-1, hexene-1, ethylene/propylene, ethylene/vinyl acetate, ethylene/butadiene, ethylene/acrylonitrile, ethylene/methyl methacrylate.

The 5-tert-alkyl-2,2′,4-trihydroxy or 5-tert-alkyl-4-alkoxy-2,2′-dihydroxy compounds are particularly useful in the photo-stabilization of polyurethane compositions which have been prepared from various polyols and polyisocyanates. It has been determined that a combination of these benzophenones with certain promoters such as selected hindered phenols, when incorporated into a polyurethane composition, bring about a significant improvement in protecting the composition against photo-degradation. Representative promoters are: 2,2′-methylene bis- (6-tert-butyl - 4 - methylphenol); 4,4'-butylidine-bis(2-tert-butyl - 5 - methylphenol); 2-benzyl-6-tert-butyl-4-methylphenol; 2,6-diisopropyl - 4 - methylphenol; 2-tert-butyl - 4,6 - dimethylphenol and N-phenyl-beta-naphthylamine. However, the most outstanding results have been obtained using any of the benzophenone compounds, not restricted to the above 2,2'-dihydroxy compounds, with polymers of vinyl chloride and vinyl fluoride, i.e. homopolymers of these vinyl halides and copolymers with minor amounts of vinyl acetate, tetrafluoroethylene, etc.

When the benzophenone compounds are applied to the various polymeric substrates, they may be used as a solution or a dispersion, or as a liquid in the form of a melt, or as a solid in the form of a powder or dust. The substrate itself may be in solution, a solid or may be a liquid in the form of a melt. In using these benzophenone compounds with the substrates they may be added at any stage during the preparation of the particular substrate provided they do not interfere with the process so as to adversely affect the physical properties of the resulting product and provided they are not transformed during the process of the preparation of the substrate. For example, when it is desired to protect linear high molecular weight polyesters or polyurethanes, it is preferred to introduce the subject compounds after polymer chain extension has been completed.

The amount of the benzophenone compound used should be from 0.0005% to 10%, based on the weight of the polymers. The particular amount required to affect the improvements of the present invention will vary depending on the particular benzophenone, the particular polymer and the particular mode of use. Thus, the lower amounts of benzophenone may be used when the compositions are used as coatings. However, when the benzophenone is distributed throughout the thickness of a polymeric film, at least 0.5% is usually necessary to provide any significant improvement. It will be evident to those skilled in the art that the films prepared from the compositions of the present invention may have incorporated therein, without impairment of their operability, materials of specific functionality. Such materials include dyestuffs, fillers, pigments, plasticizers, slip agents, anti-static agents, etc. The compositions and the resulting products are considered to be within the scope of this invention.

The following examples will better illustrate the nature of the present invention. However, the invention is not intended to be limited to these examples. Parts are by weight unless otherwise indicated.

The tensile strength ($T_B$), extension at break ($E_B$) and modulus at 300% extension ($M_{300}$) are determined at 25° C. in accordance with ASTM procedure D412-51T.

The aging caused by exposure to ultraviolet light is carried out in a color Fade-Ometer operated according to Tentative Test Method 16A-54 (1955 Technical Manual and Year Book of the American Association of Textile Chemists and Colorists, vol. XXXI, pp. 79-82).

*Example 1*

13.2 parts of 2,2',4-trihydroxybenzophenone, 66 parts of benzene and 5 parts of p-toluene sulfonic acid were heated to 65° C. while agitating. Nitrogen was introduced to displace air. Then, 68.1 parts of isobutylene was introduced with stirring into the mixture over a 2-hour period while the temperature was maintained at 65-70° C. by application of external cooling. The mixture was cooled to room temperature and diluted with 50 parts of ethyl acetate. The solution was shaken with 3 portions of water, neutralized with a dilute sodium bicarbonate solution, dried over anhydrous magnesium sulfate, and concentrated under vacuum to yield 11.5 parts of 5-tert-butyl-2,2',4-trihydroxybenzophenone.

The absorption maximum of this compound in methanol had a molar extinction coefficient of 10,500 and occurred at 3340 A. When the compound was dissolved in toluene the absorption maximum occurred at 3590 A. The effectiveness of this compound was tested in a composition with a polyurethane.

An isocyanate-terminated polyurethane, polymer A, was prepared in the following manner: 278.7 parts of toluene-2,4-diisocyanate and 1000 parts of anhydrous polytetramethyleneether glycol (molecular weight 1000) were agitated at 80° C. for 4 hours in a dry reaction vessel protected from atmospheric moisture. Polymer A thus obtained had a free isocyanate content of 4.2%, a Brookfield viscosity at 30° C. of about 16,500 cps., and a number-average molecular weight of about 2000.

To 100 parts of polymer A at 60-80° C. was added with stirring 1 part of 5-tert-butyl-2,2',4-trihydroxybenzophenone. The mixture thus prepared was cast as a film 14 to 18 mils thick which was cured by exposure for a week to ambient atmospheric moisture vapor in the absence of direct sunlight.

For a first control, control A, the above procedure was repeated except that 1 part of 2,2',4-trihydroxybenzophenone was substituted for 1 part of 5-tert-butyl-2,2',4-trihydroxybenzophenone in preparing film A.

For a second control, control B, the procedure was repeated except that 2 parts of 2,2',4-trihydroxybenzophenone were used instead of 1 part to prepare film B.

The three films were aged in a Fade-Ometer. Testing of films A and B was stopped after 90 and 110 exposure hours, respectively, since less than about a third of the original tensile strength remained. Aging of the film of the invention was continued for a total of 140 exposure hours. Table I below gives the data obtained.

TABLE I

| Exposure, Hours | Example 1 $T_B/E_B/M_{300}$ | Control A $T_B/E_B/M_{300}$ | Control B $T_B/E_B/M_{300}$ |
|---|---|---|---|
| 0 | 5,400/580/1,070 | 5,800/550/1,120 | 5,500/590/1,030 |
| 60 | | 4,850/660/1,000 | |
| 80 | 4,700/640/960 | 2,850/720/825 | 5,100/700/970 |
| 90 | | 1,700/700/750 | |
| 100 | | (1) | 3,100/710/930 |
| 110 | | | 920/340/900 |
| 120 | 3,800/680/925 | | (1) |
| 130 | 3,650/700/760 | | |
| 140 | 1,700/660/750 | | |

1 Testing discontinued.

*Example 2*

45.6 parts of 2,4-dihydroxybenzophenone, 132 parts of benzene and 15 parts of a solution of p-toluene sulfonic acid were heated to 65° C. while agitating. Nitrogen was introduced to displace air. Then 30 parts of isobutylene was bubbled steadily into the agitated mixture during a 3¼ hour period while the temperature was maintained at 65° C. by application of external cooling. The mixture was cooled to room temperature and neutralized with aqueous sodium bicarbonate. The organic layer was separated and subsequently washed with 250 parts of water. The wash water was separated and twice extracted with 88 parts of benzene. The organic phases were combined, dried over anhydrous magnesium sulfate and subsequently concentrated under vacuum to yield 53 parts of 5-tert-butyl-2,4-dihydroxybenzophenone as a yellowish crystalline solid melting at 141° C.

The absorption maxima of this compound (0.0162 mg./ml. concentration in methanol) had molar extinction coefficients of 16,900 and 12,060 and occurred at 2920 A. and 3330 A., respectively. The effectiveness of this compound was tested in a composition with cellulose acetate and compared to a control wherein 2-hydroxy-4-dodecoxybenzophenone was used.

A film sample containing 5% by weight of the 5-tert-butyl-2,4-dihydroxybenzophenone was prepared as follows: 0.1 gram of the benzophenone was added to a solvent mixture of 8 milliliters of acetone and 2 milliliters of dimethylformamide. To the resulting solution 2.0 grams of cellulose acetate powder was added while agitating the solution. The resulting solution was then spread onto a glass plate as a thin film by using an 0.015" spread bar. The solvent mixture was permitted to evaporate in air leaving the cellulose acetate film containing the benzophenone. The film was then stripped from the plate and tested.

As a control, film A, containing 5% 2-hydroxy-4-dodecoxybenzophenone was prepared substantially in the manner described above for the example using 0.1 gram of the benzophenone, the solvent mixture of 8 milliliters of acetone and 2 milliliters of dimethylformamide and 2.0 grams of cellulose acetate powder.

Samples of both films were subjected to a test to determine the effectiveness of the benzophenones by exposing the films to ultraviolet light in the following manner. A fabric was first prepared from "Dacron"[1] polyester filaments. This fabric was dyed in the conventional manner with a mixture of basic dyes so that the fabric contained 1% "Sevron" Brilliant Red B and 0.1% "Sevron" Yellow R, both percentages based on the weight of the fabric. The two films, as well as a second control, film B of cellulose acetate film containing no benzophenone, were placed over the fabric in three parallel rows. Each row was divided into three approximately equal parts. An opaque strip of cardboard was placed over the central parts of each row to prevent exposure to radiation. The remaining two parts of each row were subjected to ultraviolet radiation in a color Fade-Ometer operated according to Tentative Test Method 16A–54 (1955 Technical Manual and Year Book of the American Association of Textile Chemists and Colorists, vol. XXXI, pp. 79–82) for 40 and 70 hours, respectively. The results are summarized in Table II.

TABLE II

| | Fading of Fabric | |
|---|---|---|
| | After 40 Hours | After 70 Hours |
| Film of Example 2 (containing 5-tert-butyl-2,4-dihydroxybenzophenone). | Very little fading | Very little fading. |
| Control Film A (containing 2-hydroxy-4-dodecoxybenzophenone). | Substantial fading. | Substantial fading. |
| Cellulose Acetate Film—Control Film B (containing no benzophenone). | do | Fading substantially complete. |

*Example 3*

A film sample containing 1% by weight of 5-tert-butyl-2,4-dihydroxybenzophenone was prepared as follows: One gram of the benzophenone and 99 grams of polyvinyl fluoride were added with agitation to 300 grams of butyrolactone. The benzophenone had been prepared as in Example 2. The resulting organosol was spread onto a glass plate as a thin film by using a doctor knife. The glass plate and the film thereon were placed in an oven maintained at a temperature of 260° C. to coalesce the film. The glass plate and the coalesced film were then further heated at 150° C. for 5 minutes and then quenched in a water bath at 25° C. The film was stripped from the plate, placed in a frame and dried for 30 minutes at 150° C.

A control film sample, film A, containing 1% by weight of 5-normal-hexyl-2,4-dihydroxybenzophenone was prepared substantially in the manner described above using 1 gram of the benzophenone, 99 grams of polyvinyl fluoride and 300 grams of butyrolactone.

Samples of both films were subjected to an accelerated test by exposing the films to ultraviolet light and ozone in a weathering device. The weathering device consisted of ten 20-watt fluorescent sunlamps each 20" long. The lamps were mounted parallel to and equidistant from each other on a cylindrical support having an 8" diameter. A slotted cylindrical rack having an inside diameter of 15.5" was mounted on a rotatable table and disposed concentrically around the cylinder formed by the sunlamps. The film samples were fastened to the inside of the slotted rack and the rack was rotated continuously during the test. During the test, the temperature was maintained at about 60° C.; the relative humidiy was maintained at about 25%; and an atmosphere containing about 300 parts/million of ozone was circulated through the enclosure. At intervals, the optical density of the films was measured using radiation having a wave length of 3650 Angstrom units in the manner described in chapters 20 and 22 of volume II of "Analytical Chemistry," edited by Strouts, Gilfillan and Wilson, published by Oxford at the Clarendon Press (1955). The number of hours required to reduce the optical density of the film sample to 50% of its original value is the half-life of the sample and is directly related to the amount of useful benzophenone retained by the film. In the accelerated test, the half-life is obtained by extrapolating the substantially straight line plot of optical density v. (hours)$^{1/2}$. The results are summarized in Table III.

TABLE III

| | Average Thickness (mils) | Half-Life (hours) |
|---|---|---|
| Film of Example 3 (containing 5-tert-butyl-2,4-dihydroxybenzophenone) | 4.60 | 1,100 |
| Control Film A (containing 5-n-hexyl-2,4-dihydroxybenzophenone) | 4.70 | 400 |

*Example 4*

A polyvinyl fluoride film sample, 4 mils thick, containing 1% by weight of 5-tert-butyl-2,4-dihydroxybenzophenone was prepared as in Example 3. Two control films of polyvinyl fluoride containing 1% by weight of benzophenones outside the scope of the present invention were also prepared. Each film was placed as a screen over a 5-mil "Mylar"[1] polyester film and the combinations were exposed to ultraviolet light but without circulating ozone in the weathering device described in Example 3. The polyester film was tested for brittleness periodically by subjecting the film to 180-degree folding and creasing, the surface of the film nearest the light source being the outer surface. The polyester film was considered to have failed if it cracked upon being creased. The results are presented in Table IV.

TABLE IV

| Film | Thickness, mils | Benzophenone Used | Exposure Hours to Failure |
|---|---|---|---|
| Example 4 | 4 | 5-tert-butyl-2,4-dihydroxybenzophenone. | 3,500+ |
| Control Film | 4 | 2,4-dihydroxybenzophenone | 1,000 |
| Do | 4 | 2-hydroxy-4-decoxybenzophenone | 1,500 |

*Example 5*

35 parts of 2,2',4-trihydroxybenzophenone, 70.5 parts of benzene and 5.4 parts of concentrated sulfuric acid were mixed and heated to 70° C. in a reaction vessel which had been freed from air by a nitrogen sweep. Over an 8-hour period, 22.5 parts of 2,4,4-trimethylpentene-1 was introduced with stirring while the temperature was kept at 70° C. After agitation at 70° C. for an additional hour, the mixture was cooled to room temperature, neutralized with aqueous sodium bicarbonate, dried over anhydrous magnesium sulfate, and concentrated under vacuum to yield 30 parts of 5-(1,1,3,3-tetramethylbutyl)-2,2',4-trihydroxybenzophenone melting at 165–168° C. (after recrystallization from aqueous methanol).

[1] Registered trademark of Du Pont Co.

The absorption maximum of this compound (0.0178 mg./ml. concentration in methanol) had a molar extinction coefficient of 9,800 and occurred at 3360 A. The effectiveness of this compound was tested in a composition with polyvinyl fluoride in the manner described in Example 4.

A polyvinyl fluoride film, 3 mils thick, containing 1% by weight of the 5-(1,1,3,3-tetramethylbutyl)-2,2',4-trihydroxybenzophenone was prepared as in Example 3 and placed as a screen over a 5-mil "Mylar" polyester film. As a control, a 3-mil polyvinyl fluoride film containing 1% by weight of 2,2',4-trihydroxybenzophenone was used. The number of hours before causing brittleness in the polyester film is shown in Table V.

TABLE V

| Film | Thickness, mils | Benzophenone Used | Exposure Hours to Failure |
|---|---|---|---|
| Example 5 | 3 | 5-tert-octyl-2,2',4-trihydroxybenzophenone. | 1,700 |
| Control Film | 3 | 2,2',4-trihydroxybenzophenone | 600 |

*Example 6*

To 27 parts of 5-tert-butyl-2,4-dihydroxybenzophenone dissolved in 60 parts of methyl ethyl ketone was added with stirring 13.8 parts of potassium carbonate. The mixture was heated to 80° C. and agitated at 80–82° C. for 4.5 hours. To the potassium salt thereby obtained was added 24.9 parts of dodecyl bromide. The mixture was refluxed while agitated at 80–82° C. for 16 hours. It was then cooled to room temperature and filtered to remove the precipitated potassium bromide. The filtrate was subsequently poured into an excess of water. The precipitated 5-tert-butyl-4-dodecoxy-2-hydroxybenzophenone was recrystallized from a mixture of methanol and ligroin. A 75% yield of product was obtained melting at 74.5–75.5° C. The compound (2.58 mg./100 ml. methanol) had a molar extinction coefficient of 7860 at 3360 A. The effectiveness of this compound was tested in a composition with polyvinyl fluoride.

A polyvinyl fluoride film, 2.4 mils thick, containing 1% by weight of the 5-tert-butyl-4-dodecoxy-2-hydroxybenzophenone was prepared as in Example 3. A control film containing 1% by weight of 2-hydroxy-4-dodecoxybenzophenone was also prepared. A second control film of polyvinyl fluoride contained no benzophenone. The three films were tested in the weathering device described in Example 4. The elongation of the film samples was measured prior to the test and after 1100 hours exposure to ultraviolet radiation. The results are shown in Table VI.

TABLE VI

| Film | Benzophenone Used | Thickness | Percent Reduction in Elongation After 1100 hrs. Exposure |
|---|---|---|---|
| Example 6 | 5-tert-butyl-4-dodecoxy-2-hydroxybenzophenone. | 2.4 | 22.2 |
| Control A | 2-hydroxy-4-dodecoxybenzophenone. | 2.2 | 53.1 |
| Control B | None | 2.7 | 95.0 |

*Example 7*

35 parts of 2,2',4-trihydroxybenzophenone, 62 parts of benzene and 4.5 parts of concentrated sulfuric acid were mixed and heated to 70° C. in a reaction vessel which had been freed from air by a nitrogen sweep. Over a 5½ hour period, 18 parts of 2-methylpentene-1 was introduced with stirring while the temperature was kept at 70° C. After agitation for an additional half-hour at 70° C., the mixture was cooled to room temperature, neutralized with aqueous sodium bicarbonate, dried over anhydrous magnesium sulfate and concentrated under vacuum to yield 26.4 parts of crystalline 5-(1,1-dimethylbutyl)-2,2',4-trihydroxybenzophenone melting at 125° C. (after recrystallization from aqueous methanol).

The absorption maximum of this compound (0.0182 mg./ml. concentration in methanol) had a molar extinction coefficient of 10,150 and occurred at 3335 A. The effectiveness of this compound was tested in a composition with a vinyl fluoride/vinyl acetate copolymer.

A film of vinyl fluoride/vinyl acetate copolymer (11 weight percent vinyl acetate), 4 mils thick, containing 1% by weight of the 5-(1,1-dimethylbutyl)-2,2',4-trihydroxybenzophenone was prepared as in Example 3. A control copolymer film containing 1% by weight of 5-n-hexyl-2,2',4-trihydroxybenzophenone was also prepared. The two films were tested in the weathering device described in Example 3. The results are shown in Table VII.

TABLE VII

| Film | Benzophenone Used | Half-Life (in hours) |
|---|---|---|
| Example 7 | 5-(1,1-dimethylbutyl)-2,2',4-trihydroxybenzophenone. | 1,000 |
| Control Film | 5-n-hexyl-2,2',4-trihydroxybenzophenone | 450 |

*Example 8*

45.75 parts of 2-methyl-butene-1 was introduced over a 4.5 hour period to a well-agitated mixture maintained at 75° C. and consisting of 50 parts of 2,4-dihydroxybenzophenone, 88 parts of benzene and 15 parts of p-toluene sulfonic acid. Agitation was continued at 75° C. for a half-hour. The mixture was then cooled to room temperature and neutralized with a dilute sodium bicarbonate solution. After evaporation of the solvent, 49.6 parts of an organic crystalline solid precipitated. After crystallization from methanol pure 5-tert-amyl-2,4-dihydroxybenzophenone was obtained melting at 116° C.

The 5-tert-amyl-2,4-dihydroxybenzophenone obtained had an absorption maximum (0.0200 mg./ml. concentration in methanol) at 3340 A. The effectiveness of the compound was tested in a composition with vinyl fluoride/tetrafluoroethylene copolymer.

A film of vinyl fluoride/tetrafluoroethylene copolymer (15 weight percent tetrafluoroethylene), 4 mils thick, containing 1% by weight of the 5-tert-amyl-2,4-dihydroxybenzophenone was prepared as in Example 3. A control copolymer film containing 1% by weight of 5-n-amyl-2,4-dihydroxybenzophenone was also prepared. The two films were tested in the weathering device described in Example 3. The results are shown in Table VIII.

TABLE VIII

| Film | Benzophenone Used | Half-Life (hours) |
|---|---|---|
| Example 8 | 5-tert-amyl-2,4-dihydroxybenzophenone | 1,200 |
| Control Film | 5-n-amyl-2,4-dihydroxybenzophenone | 500 |

*Example 9*

Film samples were made by pressing between polished plates for 30 seconds under 20 tons pressure at 150° C. portions of milled samples of polyvinyl chloride with 2% by weight of 5-tert-butyl-2,2',4-trihydroxybenzophenone prepared as in Example 1. As a control, a polyvinyl chloride film containing 2% by weight of 5-n-butyl-2,2',4-trihydroxybenzophenone was made. The film samples were then exposed to the weathering device without ozone described in Example 4 and the length of time to reduce the elongation of each to less than 50% of its original value was determined. The results are shown in Table IX.

TABLE IX

| Film | Benzophenone Used | Hours to 50% Drop In Elongation |
|---|---|---|
| Example 9 | 5-tert-butyl-2,2',4-trihydroxybenzophenone. | 440 |
| Control Film | 5-n-butyl-2,2',4-trihydroxybenzophenone | 260 |

*Example 10*

28.6 parts of 5-tert-butyl-2,2',4-trihydroxybenzophenone, 13.8 parts of potassium carbonate and 80 parts of methyl ethyl ketone were agitated at reflux for 4 hours. Then 24.9 parts of lauryl bromide was quickly introduced. The mixture obtained was agitated at reflux for the next 16 hours. It was cooled and the inorganic salts were removed by filtration. The filtrate was poured into water, the pH was adjusted to a value of 5–6 by the addition of dilute hydrochloric acid, and the precipitated solids were collected by filtration, washed with water and dried under vacuum. Recrystallization of the solids from methanol gave 40 parts of 5-tert-butyl-4-dodecoxy-2,2'-dihydroxybenzophenone melting at 81° C.

*Analysis.*—Calcd. for $C_{29}H_{42}O_4$: C, 76.61; H, 9.31. Found: C, 76.62; H, 9.24.

The absorption maximum of this compound (0.0258 mg./ml. in methanol) had a molar extinction coefficient of 10,770 occurring at 3350 A; in isoctane the maximum had a value of 13,600 and occurred at 3595 A. The effectiveness of the compound was tested in a composition with vinyl chloride/vinyl acetate copolymer.

A vinyl chloride/vinyl acetate copolymer (15 weight percent vinyl chloride) was formed into a film containing 1% by weight of the benzophenone by pressing the ingredients between polished plates for 30 seconds under 20 tons pressure at 160° C. As a control, a copolymer film containing 1% by weight of 5-n-butyl-4-dodecoxy-2,2'-dihydroxybenzophenone was prepared similarly. The two films were then exposed to the weathering device described in Example 3 and the time for decrease of elongation to 50% of its original value was determined for both films. The results are shown in Table X.

TABLE X

| Film | Benzophenone Used | Hours to 50% Drop In Elongation |
|---|---|---|
| Example 10 | 5-tert-butyl-4-dodecoxy-2,2'-dihydroxybenzophenone. | 350 |
| Control Film | 5-n-butyl-4-dodecoxy-2,2'-dihydroxybenzophenone. | 220 |

*Example 11*

This example describes an alternative process to Example 1 for preparing excellent yields of 5-tert-butyl-2,2',4-trihydroxybenzophenone.

109.6 parts of 2,2',4-trihydroxybenzophenone, 198 parts of benzene and 5.4 parts of concentrated sulfuric acid were heated to 70° C. while agitated. After air had been displaced by a nitrogen sweep, 32.9 parts of isobutylene was introduced over a 2-hour period while the temperature was held at 70° C. The mixture was then cooled to 0° C. The precipitated crystals were collected by filtration, freed from acid by water washes, and dried under vacuum. 111.3 parts of 5-tert-butyl-2,2',4-trihydroxybenzophenone was obtained.

To 235 parts of the filtrate was added with stirring 44 parts of benzene, 82.9 parts of 2,2',4-trihydroxybenzophenone and 3.6 parts of concentrated sulfuric acid. Over a 1.5 hour period at 70° C., 20.2 parts of isobutylene was then introduced with agitation. On cooling the mixture, 77 parts of product was precipitated (M.P. 175–180° C.) and collected by filtration. To the filtrate was added 110 parts of trihydroxybenzophenone and 1.8 parts of concentrated sulfuric acid. Over a 2-hour period, 35.8 parts of isobutylene was introduced while the temperature was maintained at 70° C. On cooling to 0° C., 123.4 parts (90% of theory) of crude product was obtained melting at 178–182° C. After recrystallization from methanol, it melted at 194–196° C.

Examples 12–14 describe processes for preparing other useful benzophenones within the scope of the present invention.

*Example 12*

27 parts of 5-tert-butyl-2,4-dihydroxybenzophenone, 13.8 parts of potassium carbonate and 60 parts of methyl ethyl ketone were agitated at reflux for 5 hours. Then over a 3-hour period, 13 parts of dimethyl sulfate was introduced with stirring. 40 parts of methyl ethyl ketone was added to lower the viscosity of the reaction mixture. After 2 more hours at reflux, the mixture was cooled to room temperature and the inorganic salts were removed by filtration. The filtrate was poured into water, the pH was adjusted to a value of 5–6 by the addition of dilute hydrochloric acid, and the precipitated solids were collected by filtration, washed with water and dried under vacuum. Recrystallization of the solids from methanol gave 23 parts of 5-tert-butyl-2-hydroxy-4-methoxybenzophenone melting at 93° C.

*Analysis.*—Calcd. for $C_{18}H_{20}O_3$: C, 76.03; H, 7.09. Found: C, 76.04; H, 7.10.

The absorption maximum of this compound (0.0169 mg./ml. in methanol) had a molar extinction of 8,900 at 3550 A.

*Example 13*

20 parts of 2,2',4-trihydroxybenzophenone, 39.5 parts of benzene and 2.7 parts of concentrated sulfuric acid were heated to 70° C. in a reaction vessel which had been freed from air by a nitrogen sweep. Over a 3-hour period, 9 parts of 2-methyl-butene-1 was introduced with stirring while the temperature was kept at 70° C. After agitation for an additional hour at 70° C., the mixture was cooled to room temperature, neutralized with aqueous sodium bicarbonate, dried over anhydrous magnesium sulfate and concentrated under vacuum to yield 21.3 parts (81.6% of theory) of a crystalline 5-tert-amyl-2,2',4-trihydroxy-benzophenone, melting at 142–144° C.

The absorption maximum of this compound (0.0181 mg./ml. concentration in methanol) had a molar extinction of 10,000 and occurred at 3330 A.

*Example 14*

28.6 parts of 5-tert-butyl-2,2',4-trihydroxy-benzophenone, 13.8 parts of potassium carbonate and 80 parts of methyl ethyl ketone were agitated at reflux for 4 hours. Then over a one-hour period 13 parts of dimethyl sulfate was introduced with stirring. 73 parts of methyl ethyl ketone was added and the mixture was agitated at reflux for 2½ hours more. It was cooled and treated as described in Example 10 above. Recrystallization of the solids from methanol gave 28 parts of 5-tert-butyl-2,2'-dihydroxy-4-methoxybenzophenone melting at 116.5° C.

*Analysis.*—Calcd. for $C_{18}H_{20}O_4$: C, 71.98; H, 6.71. Found: C, 71.75; H, 7.15.

The absorption maximum of this compound (0.015 mg./ml. in methanol) had a molar extinction coefficient of 9860 occurring at 3350 A.

As many widely different embodiments of this invention may be made without departing from the spirit and scope thereof, it is to be understood that this invention is not limited to the specific embodiments thereof except as defined in the appended claims.

Having fully disclosed the invention, what is claimed is:

1. A composition of matter consisting essentially of a polymer selected from the group consisting of neoprene, polyurethanes, butadiene polymers, polyamides, polyesteramides, cellulose esters, polymers of acrylic esters, polymers of acrylonitrile, polymers of methacrylonitrile, polyesters, vinyl polymers, vinylidene polymers and olefin polymers and 0.0005–10% based on the weight of the polymer, of at least one benzophenone compound of the following formula:

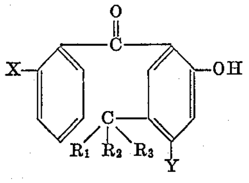

wherein

X is a radical selected from the group consisting of hydrogen and hydroxy,

Y is a radical selected from the group consisting of hydroxy and alkoxy having no more than 20 carbon atoms, and

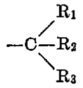

is a radical selected from the group consisting of tertiary butyl, tertiary amyl, 1,1-dimethylbutyl and 1,1,3,3-tetramethylbutyl.

2. A composition of matter consisting essentially of a polymer selected from the group consisting of neoprene, polyurethanes, butadiene polymers, polyamides, polyesteramides, cellulose esters, polymers of acrylic esters, polymers of acrylonitrile, polymers of methacrylonitrile, polyesters, vinyl polymers, vinylidene polymers and olefin polymers and 0.5–10%, based on the weight of the polymer, of at least one benzophenone compound of the following formula:

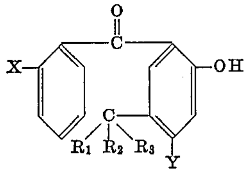

wherein

X is a radical selected from the group consisting of hydrogen and hydroxy,

Y is a radical selected from the group consisting of hydroxy and alkoxy having no more than 20 carbon atoms, and

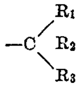

is a radical selected from the group consisting of tertiary butyl, tertiary amyl, 1,1-dimethylbutyl and 1,1,3,3-tetramethylbutyl.

3. A shaped article consisting essentially of a polymer selected from the group consisting of neoprene, polyurethanes, butadiene polymers, polyamides, polyesteramides, cellulose esters, polymers of acrylic esters, polymers of acrylonitrile, polymers of methacrylonitrile, polyesters, vinyl polymers, vinylidene polymers and olefin polymers and 0.0005–10%, based on the weight of the polymer, of at least one benzophenone compound of the following formula:

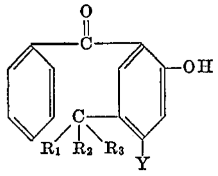

wherein

X is a radical selected from the group consisting of hydrogen and hydroxy,

Y is a radical selected from the group consisting of hydroxy and alkoxy having no more than 20 carbon atoms, and

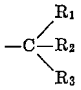

is a radical selected from the group consisting of tertiary butyl, tertiary amyl, 1,1-dimethylbutyl and 1,1,3,3-tetramethylbutyl.

4. A self-supporting film consisting essentially of a polymer selected from the group consisting of neoprene, polyurethanes, butadiene polymers, polyamides, polyesteramides, cellulose esters, polymers of acrylic esters, polymers of acrylonitrile, polymers of methacrylonitrile, polyesters, vinyl polymers, vinylidene polymers and olefin polymers and 0.0005–10% based on the weight of the polymer, of at least one benzophenone compound of the following formula:

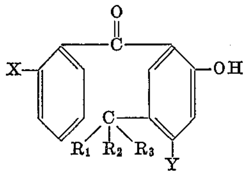

wherein

X is a radical selected from the group consisting of hydrogen and hydroxy,

Y is a radical selected from the group consisting of hydroxy and alkoxy having no more than 20 carbon atoms, and

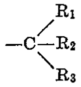

is a radical selected from the group consisting of tertiary butyl, tertiary amyl, 1,1-dimethylbutyl and 1,1,3,3-tetramethylbutyl.

5. A self-supporting film consisting essentially of a polymer selected from the group consisting of neoprene, polyurethanes, butadiene polymers, polyamides, polyesteramides, cellulose esters, polymers of acrylic esters, polymers of acrylonitrile, polymers of methacrylonitrile, polyesters, vinyl polymers, vinylidene polymers and olefin polymers and 0.5–10%, based on the weight of the polymer, of at least one benzophenone compound of the following formula:

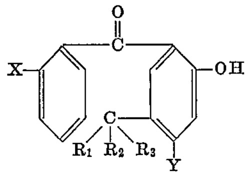

wherein

X is a radical selected from the group consisting of hydrogen and hydroxy,

Y is a radical selected from the group consisting of hydroxy and alkoxy having no more than 20 carbon atoms, and

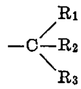

is a radical selected from the group consisting of tertiary butyl, tertiary amyl, 1,1-dimethylbutyl and 1,1,3,3-tetramethylbutyl.

6. A composition according to claim 1 wherein said polymer is a polyurethane.

7. A composition according to claim 1 wherein said polymer is a cellulose ester.

8. A composition according to claim 1 wherein said polymer is a vinyl fluoride polymer.

9. A composition according to claim 1 wherein said polymer is a vinyl chloride polymer.

10. A self-supporting film according to claim 5 wherein said polymer is polyvinyl fluoride.

11. A self-supporting film according to claim 5 wherein said polymer is polyvinyl chloride.

12. A self-supporting film according to claim 5 wherein said polymer is vinyl fluoride/vinyl acetate copolymer.

13. A self-supporting film according to claim 5 wherein said polymer is vinyl fluoride/tetrafluoroethylene copolymer.

14. A self-supporting film according to claim 5 wherein said polymer is cellulose acetate.

15. A self-supporting film according to claim 5 wherein said benzophenone is 5-tert-butyl-2,4-dihydroxybenzophenone.

16. A self-supporting film according to claim 5 wherein said benzophenone is 5-tert-butyl-4-dodecoxy-2-hydroxybenzophenone.

References Cited in the file of this patent

UNITED STATES PATENTS

| | | |
|---|---|---|
| 2,773,778 | Hoch et al. | Dec. 11, 1956 |
| 2,876,210 | Wynn et al. | Mar. 3, 1959 |
| 2,906,778 | Gordon | Sept. 29, 1959 |
| 2,971,030 | Hudson | Feb. 7, 1961 |
| 2,974,053 | Suchow | Mar. 7, 1961 |
| 2,976,259 | Hardy et al. | Mar. 21, 1961 |